Aug. 28, 1962     A. H. PETERSEN     3,050,966
CLUTCH MECHANISM
Filed Sept. 18, 1961

INVENTOR.
ALFRED H. PETERSEN
BY
Morris M. Chaben
ATTORNEY

United States Patent Office 3,050,966
Patented Aug. 28, 1962

3,050,966
CLUTCH MECHANISM
Alfred H. Petersen, Brookfield, Ill., assignor to General
Electric Company, a corporation of New York
Filed Sept. 18, 1961, Ser. No. 138,790
3 Claims. (Cl. 64—30)

The present invention relates to clutch mechanisms and more particularly to constant torque clutch mechanisms of the type transmissive of power to a shaft coaxial to the clutch mechanism.

The clutch mechanism as described herein is of particular usefulness in a clothes washing machine as will be described herein. The clutch provides a method of driving the wash basket at a high rate of speed when there is little resistance to the rotation of the basket in the form of water standing in the wash tub and at low speed when there is standing water. With standing water in the tub, the water provides resistance which acts as a drag on the rotating basket. This drag is transmitted along the axial basket drive shaft to the clutch mechanism and in turn causes the clutch plates of the mechanism to slip. Slipping of the clutch plates permits only a portion of the power received by the clutch mechanism to be transmitted to the basket shaft and results in the basket rotating at a comparatively low speed. This application of the clutch mechanism is only for explanatory purpose and it can readily be seen that this clutch mechanism is capable of adaptation to many circumstances and applications.

It is therefore an object of the invention to provide an improved and simply constructed slip clutch mechanism comprising elementally a pair of substantially annular clutching surfaces with a constant spring-biased pressure exerted therebetween.

Briefly described, the clutch receives power from a pulley belt driven by a drive motor. To the driven pulley is secured rotatably a U-shaped frame encompassing in a freely rotative manner the driven shaft. The driven shaft has secured to it a first clutching member which is rotatable with the shaft. A pressure plate rotatable with the frame is positioned adjacent the clutching member and is spring-biased to exert a constant axial force against the clutching member.

When the pulley sheave is rotated by the drive motor, the sheave rotates freely on the axial shaft. The frame and pressure plate, or as it may be called the drive clutch plate, will rotate with the pulley and the pressure plate will exert the spring-biased axial force, previously mentioned, against the shaft clutching member. The shaft clutching plate will be biased into surface contact with the pressure plate and the sheave bearing, will rotate and will cause the shaft to rotate. The shaft will rotate at substantially the pulley speed if there is no resistive drag imposed on the shaft from above. With drag on the shaft, this drag tends to counter or resist the effect of the spring-biased pressure on the shaft clutch member and the shaft will rotate at a low or slipping speed dependent on the amount of drag. The effective power transmitted by this clutching mechanism will be the input power received, less the power necessary to overcome the resistance to rotation of the shaft. With little resistance, the transmitted power will be great; with heavy resistance, the transmitted power will, of necessity, be considerably less.

This invention both as to its organization and principle of operation, together with further objects and advantages thereof, will best be understood by reference to the following specification taken in connection with the accompanying drawings in which.

Figure 1:
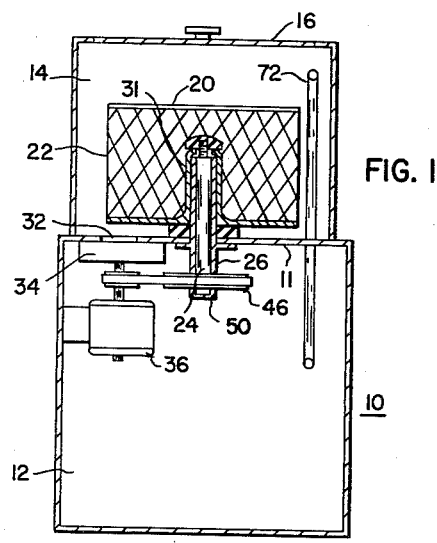
FIG. 1 shows a section through the center of a washing machine employing the clutch mechanism.

Viewing FIG. 1, there can be seen a washing machine encased in a substantially rectangular appearance cabinet 10 which is compartmented by means of a horizontal wall 11 into a machinery compartment 12 (the lower compartment) and a water retentive washing compartment 14 (the upper compartment). A suitable lid 16 may be positioned to enclose the top of the machine, the lid being removable to allow access to the washing compartment. Within the washing compartment there is mounted a cylindrical wash basket 20, which preferably is constructed of open wire mesh material or the like, with the open mesh cylindrical sidewall 22 visible in FIG. 1. This basket is mounted for rotation on a vertical axis shaft 24 which extends downwardly through the compartmental divider wall 11 into the machinery compartment 12. This shaft fits within a suitable tubular support member 26. This support member is suitably fixed to the horizontal wall 11 to secure the member 26 against rotation or axial displacement. Within the support member at each opposed end is a sleeve bearing member 27, of any known type, which serves to rotatably support the shaft within the tube.

Figure 5:
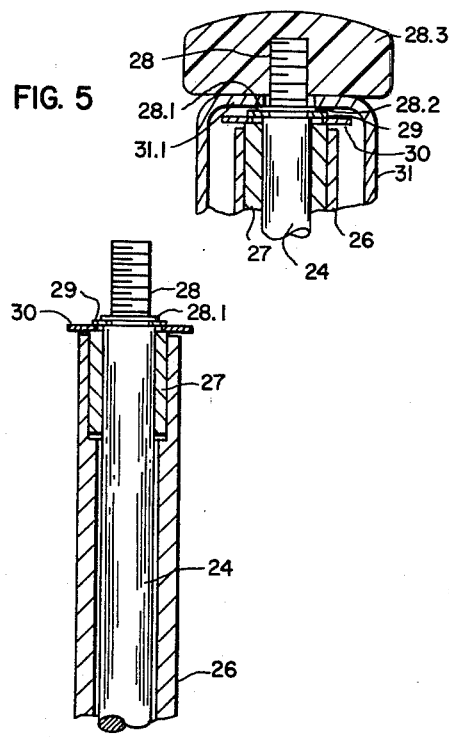
FIG. 5 is an enlarged section in detail of the upper end of the central drive shaft of FIG. 1.

Now viewing FIG. 5, there can be seen the connection of the basket shaft 24 to the basket 20 and the mounting of this connection on the shaft support member 26. At its upper end, shaft 24 has parallel flats indented along opposite sides of the shaft. These flats extend along the shaft for a vertical extent of approximately one to one and a half inches and throughout this extent the remaining periphery of the shaft is threaded as indicated by the numeral 28. The indented flats form at their lower extent, horizontally-extending, circular segmental shoulders 28.1. Below these shoulders the shaft is notched annularly at 28.2 to receive a split ring 29. This ring positions below it a support ring or bearing 30 which in turn rests on the upper surface of the upper of the support bearings 27. It can be seen in FIG. 5 that the bearing 27 protrudes slightly above the adjacent upper edge of the support member 26. This protrusion provides a bearing surface for the supporting ring 30. The support member 26, as previously described, is mounted stationarily to the cabinet structure at the compartment divider 11 and is secured against movement axially or radially. Thus, bearing 27 furnishes a stationary resting plate for the support ring 30 which in turn defines the downward extent of movement of the drive shaft 24 by its positioning below the split ring. The shaft 24 is capable of limited upward axial travel as will be explained more fully later.

The basket 20 at its center includes a tubular axial support 31, which is of sufficient inner diameter to fit freely about shaft support 26 with considerable clearance. This basket support 31 at its upper end terminates in an inturned annular flange 31.1. Flange 31.1 includes at its center an opening (not shown) which matches with the shape of the shaft 24 within the extent of the indented flats and is designed to rest on shoulders 28.1. A cap nut 28.3 is internally tapped to tighten on the shaft threading 28 and squeeze the flange 31.1 against shoulders 28.1. Thus, on rotation of shaft 24, rotational force is imparted by the indented flats above shoulders 28.1 to the flange 31.1, axial tubular support 31 and the basket itself.

Within divider wall 11, as shown in FIG. 1, there may be a water exhaust opening 32 leading to a drain pump 34 within the machinery compartment. Preferably the pump should be of the type which pumps out liquid from the exhaust opening to a suitable drain conduit (not shown) in one direction of rotation and does not pump on the other direction of rotation. Connected in driving relationship to pump 34 is an electric drive motor 36 which may be any suitable appliance motor rotative at a single synchronous speed and which through suitable controls (not shown) may be controlled for rotation first in one direction and then in the other.

Figure 3:
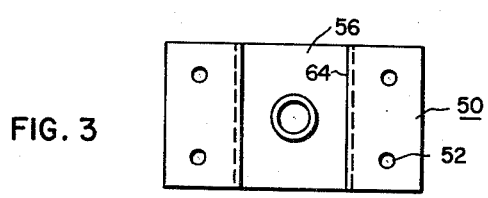
FIG. 3 is a top plan view of the U-shaped frame of FIG. 2 as a separate element.
Figure 4:
FIG. 4 is a top plan view of the driving clutch plate of FIG. 2 as a separate element.
Figure 2:
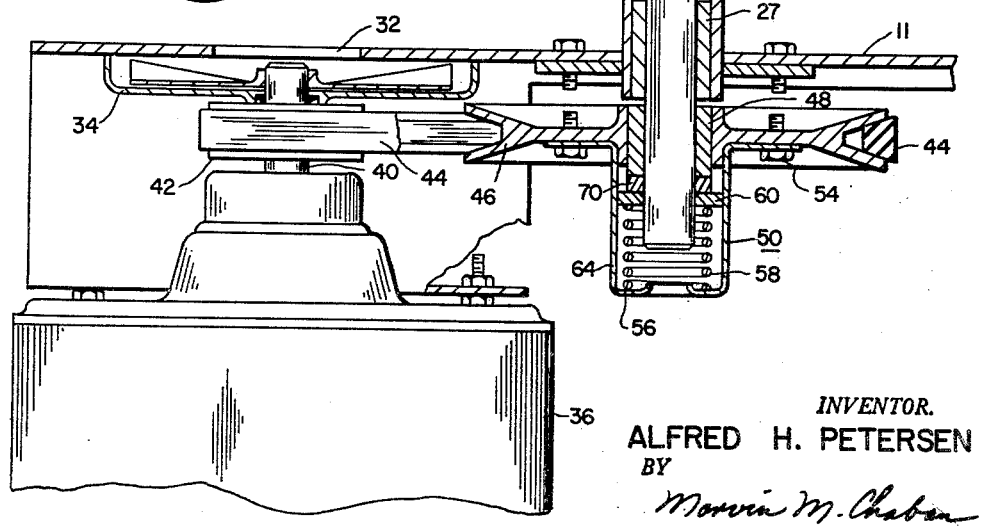
FIG. 2 shows an enlarged section through the center of the clutch mechanism of FIG. 1.

Viewing FIG. 2 in further detail, the drive motor 36 can be seen to have a rotatable drive shaft 40 extending upwardly to drive pump 34. Shaft 40 has affixed thereto a motor pulley or sheave 42 which will rotate on rotation of the motor. Laced about sheave 42 is a drive belt 44 which may be an endless V belt, well-known in the power transmission arts. Belt 44 is also passed about a second sheave 46 mounted upon the basket drive shaft 24 by means of a relatively thick-walled bearing 48 which allows free rotation of the sheave upon the drive shaft. It should be noted that there is a gap axially between sheave 46 and the lower support bearing 27, which as previously mentioned is secured to the support member 26. This gap allows a limited amount of travel of the shaft in an axial direction. Secured to the underside of sheave 46 is a frame 50 of sheet metal or the like, seen in detail in FIG. 3 also. This frame 50, which also may be called end cap 50, has a number of mounting holes 52 through which are fitted suitable screw fasteners 54 by which the frame is mounted to the underside of the inner web of the drive sheave. The frame depends in substantially a U shape from below the center of the drive sheave to form an open-sided structure with a horizontal base plate 56 or nexus, spaced away from the underside of the sheave parallel thereto. Between the legs of the frame, fitted coaxially to the basket drive shaft is a coiled compression spring 58 bottoming against the nexus 56 of the frame. The upper surface of the compression spring rests against a clutching or pressure plate 60. Clutch plate 60 is substantially annular with opposed segments of the annulus cut away to form parallel straight sidewalls 62. The across-the-flats dimension of plate 60 between walls 62 is but slightly less than the interior dimension between the parallel depending legs 64 of the frame 50 so that the pressure plate 60 will fit within the frame legs and will be held therein in a rotary direction. At its center, pressure plate 60 has a central opening 66 of a slightly greater dimension than the diameter of basket drive shaft 24. By this dimensioning and fitting, clutch plate 60 will rotate with the frame 50 on rotation of drive sheave 46 but will not rotate shaft 24 through the medium of central opening 66. Further, pressure plate 60, due to the freedom of fit between the plate and the legs of the U frame, is free to move axially as acted upon by the pressure of compression spring 58. Positioned axially above clutch plate 60 is a second clutch plate 70 which is annular in shape and is fitted tightly, by suitable means such as a pressure fit or welding, to the drive shaft 24. The diameter of plate 70 is preferably not less than the diameter of plate 60 measured across the walls 62 thereof, but is considerably less than the between-legs dimension of the U-frame legs 64 to insure that on rotation of shaft 24, plate 70 will rotate therewith with no interference against legs 64. As is apparent in FIG. 2, the wall of bearing 48 preferably is equal to the adjacent surface of plate 70, whereupon said plate is engaged by upper and lower surfaces of substantially equal effective area.

Both clutch plates 60 and 70 may be fabricated from generally known classes of lubricant-impregnated bearing materials to alleviate the necessity of oiling or greasing while the plates are pressing frictionally against one another. Suitable generally known powdered, sintered metal with oil impregnated within may be used for the construction of these clutch plates.

Further, the machine shown in FIG. 1 may have suitable sequence controls (not shown) which control the operation and release of the various elements at their proper time. There is also provided a suitable water inlet conduit 72 with an outlet above the basket to feed wash water from a water inlet source (not shown) to the washing compartment 14. Control mechanisms such as valves and solenoids (not shown) may be used to govern the flow of water into the wash tub in any conventional known fashion.

Now describing the operation of the machine generally, clothes to be washed are placed within basket 20, the lid 16 is replaced and the sequential controls (not shown) are set for automatic operation. Water is fed into washing compartment 14 through conduit 72 filling the compartment to a level a few inches below the top of sidewall 22 of the basket. The motor 36 is then energized in the direction which does not pump liquid out of the wash compartment. By means of the clutch mechanism, as will be explained more fully, the basket rotates slowly (25 to 60 r.p.m.) and the clothes are agitated by suitable means (not shown). At the conclusion of the wash period, the motor direction is reversed, and pump 34 drains water from the compartment 14. With the decrease in water level, basket 20 rotates more quickly and finally reaches a speed of approximately 400 to 600 r.p.m. This speed centrifuges additional liquid from the clothes and the pump removes this liquid from the compartment. Suitable rinses and spins may follow in the known manner.

Now turning to the operation of the clutch for low speed, it must be remembered that compartment 14 in which the basket is resting is substantially full of wash water. At this time, motor 36 is driving motor sheave 42 at substantially the motor synchronous speed. Through belt 44, the motor drive is transmitted to drive sheave 46 which rotates at a high speed. By suitable selection of pulley ratios, sheave 46 may be driven at a speed ⅓ that of motor sheave 42. The drive sheave rotates bearing 48 which is fitted to rotate freely on shaft 24 without transmitting power therethrough. As sheave 46 rotates, end cap or frame 50 rotates at the sheave speed through the direct connection at screw fastenings 54. Clutch plate 60 rotates at the sheave speed because of its tight radial fit within the legs 64 of frame 50. Clutch plate 60 is biased axially upwardly by the effect of compression spring 58 into surface contact with the upper clutch plate 70.

As previously described, shaft 24 is firmly coupled to the mesh basket 20 through the basket tube 31 and its inwardly directed flange 31.1. Basket 20 is resting within the mass of water in compartment 14 and it is obvious that the water mass will act on the basket to resist efforts of the basket to rotate. This resistance to rotation will be transmitted through shaft 24 to clutch plate 70 which is firmly secured to the shaft. Lower plate 60 will be forced upwardly against plate 70 with the force of spring 58 and will impart a measure of its rotative force against the shaft secured plate 70. Plate 70 will thereby be biased between clutch plate 60 and the lower surface of bearing 48 and will begin to rotate. As clutch plate 70 rotates, shaft 24 will also rotate slowly. This slowness of rotation of the shaft 24 and its clutch plate 70 will occur due to slippage between the two clutch plates in amount substantially equal to the resistance of the standing water on the basket. In this way, basket 20 will also be rotated at the speed which is transmitted through basket drive shaft 24. At this low rotative speed of the shaft and spin basket, clothes in the basket will be thoroughly washed.

When the wash water has been drained from the tub, little resistance to rotation of the basket will be offered by the air then surrounding the basket. Sheave 46 and frame 50 will rotate clutch plate 60 as before. Since little resistance to rotation is offered by the basket 20 and shaft 24, shaft clutch plate 70 will offer little resistance to rotation and will tend to rotate at virtually the same speed as the drive clutch plate 60. With little resistance from above, the axial force imparted by spring 58 to clutch plate 60 will be sufficient to keep the two clutch plates 60 and 70 in good surface contact and virtually all of the input torque will be transmitted to the drive shaft and the driven basket.

While there has been described what is at present thought to be the preferred embodiment of the invention, it will be understood that various modifications may be made therein and it is intended to cover in the appended claims all such modifications as fall within the true spirit and scope of the invention.

What is claimed is:

1. In combination, a stationary base, a tubular support member fixed thereon against rotational or axial displacement relative thereto, shaft means disposed within said support member for rotational and axial displacement therein, said shaft means and said support member having at one end bearing means establishing a predetermined limit of axial displacement of said shaft means in one direction while permitting rotation thereof, a drive sheave having a sleeve bearing receiving an opposite end portion of said shaft means whereby said drive sheave is rotatable and axially movable on said shaft, a first annular clutch plate member of lubricant-impregnated material fixed on said shaft below said sleeve bearing to provide a rotational base for said drive sheave, a U-shaped frame fixed at the extremities of its leg portions to said drive sheave, said leg portions extending in parallel spaced relation to said shaft, the nexus of said frame extending across said shaft in spaced relation to the end thereof, a second annular clutch plate member of lubricant-impregnated material disposed within said frame for axial displacement therein and rotation therewith, and spring means encircling said shaft and bearing against said frame and said second clutch plate to maintain said first and second clutch plates in frictional engagement.

2. A slip clutch for rotating a shaft subjected to varying forces resisting the rotation thereof, comprising a driving sheave having a sleeve bearing of substantial wall thickness fixed within the hub of said sheave and freely rotatable and axially displaceable on said shaft, a substantially U-shaped frame having leg portions fixed at their respective ends to said sheave at the hub thereof, said leg portions extending in parallel spaced relation to said shaft on diametrically opposite sides thereof, the nexus of said frame extending diametrically across said shaft in spaced relation to the end thereof, a first annular clutch plate of lubricant-impregnated metal disposed about said shaft for rotation relative thereto, said clutch plate being embraced by the legs of said frame to be rotated thereby, and a second annular clutch plate of lubricant-impregnated metal fixed about said shaft to rotate the same, a wall surface of said second clutch plate being in friction contact with the adjacent surface of said first clutch plate, and spring means disposed about said shaft between said first clutch plate and the nexus of said frame to confine said second clutch plate frictionally between said first clutch plate and said sleeve bearing.

3. A slip clutch for rotating a shaft subjected to various forces resisting the rotation thereof; comprising a driving sheave having a sleeve bearing of substantial wall thickness fixed within the hub of said sheave and freely rotatable and axially displaceable on said shaft, a substantially U-shaped frame having leg portions fixed at their respective ends to said sheave, said leg portions extending in parallel spaced relation to said shaft on diametrically opposite sides thereof; the nexus of said frame extending diametrically across said shaft in spaced relation to the end thereof, a first annular clutch plate disposed about said shaft for rotation relative thereto, a first clutching surface on said plate, diametrically-opposed integral walls defining said clutching surface and positioned to engage with said leg portions in axially-displaceable, non-rotatable, relation thereto, a second annular clutch plate fixed about said shaft to rotate the same, said second clutch plate having an upper and lower clutching surface equal respectively to the wall thickness of said sleeve bearing and the adjacent surface of said first clutch plate measured across the defining walls thereof, and spring means disposed about said shaft between said first clutch plate and the nexus of said frame member, whereby to confine said second clutch plate frictionally between said first clutch plate and the end wall of said sleeve bearing.

References Cited in the file of this patent

UNITED STATES PATENTS

| 1,517,285 | Fischedick et al. | Dec. 2, 1924 |
| 1,541,198 | Teter | June 9, 1925 |
| 1,781,173 | Green | Nov. 11, 1930 |
| 2,436,418 | Bradford | Feb. 24, 1948 |

FOREIGN PATENTS

| 11,878 | Great Britain | May 14, 1914 |